US005684498A

United States Patent [19]
Welch et al.

[11] Patent Number: 5,684,498
[45] Date of Patent: Nov. 4, 1997

[54] FIELD SEQUENTIAL COLOR HEAD MOUNTED DISPLAY WITH SUPPRESSED COLOR BREAK-UP

[75] Inventors: Brian L. Welch, Baie D'Urfé; Andrew Fernie, Montreal, both of Canada

[73] Assignee: CAE Electronics Ltd., Montreal, Canada

[21] Appl. No.: 494,822

[22] Filed: Jun. 26, 1995

[51] Int. Cl.[6] .................................................. G09G 5/00
[52] U.S. Cl. .................................. 345/8; 345/7; 345/13; 345/32
[58] Field of Search ........................ 345/7, 8, 9, 12, 345/13, 32, 115, 150

[56] References Cited

U.S. PATENT DOCUMENTS

| 4,348,185 | 9/1982 | Breglia et al. |
|---|---|---|
| 4,349,815 | 9/1982 | Spooner ........................... 345/8 |
| 4,606,606 | 8/1986 | Freeman . |
| 4,683,467 | 7/1987 | Macaulay et al. . |
| 4,737,778 | 4/1988 | Nishi et al. . |
| 5,181,098 | 1/1993 | Guerin et al. . |
| 5,200,815 | 4/1993 | Tsujihara et al. . |
| 5,231,481 | 7/1993 | Eouzan et al. . |
| 5,298,985 | 3/1994 | Tsujihara et al. . |
| 5,345,262 | 9/1994 | Yee et al. . |
| 5,348,477 | 9/1994 | Welch et al. . |
| 5,369,450 | 11/1994 | Haseltine et al. . |
| 5,422,653 | 6/1995 | Maguire, Jr. . |
| 5,424,556 | 6/1995 | Symosek et al. ........................ 345/8 |
| 5,446,834 | 8/1995 | Deering . |
| 5,574,473 | 11/1996 | Sekiguchi ........................ 345/22 |
| 5,579,026 | 11/1996 | Tabata ........................ 345/8 |

FOREIGN PATENT DOCUMENTS

| 0 502 643 A2 | 9/1992 | European Pat. Off. . |
| 0 709 816A2 | 5/1996 | European Pat. Off. . |
| WO94/09472 | 4/1994 | WIPO . |

OTHER PUBLICATIONS

B. Welch et al, "HDTV virtual reality" pp. 407–410.
S12–5 "HDTV Virtual Reality" by B. Welch, R. Kruk, CAE Electr. Ltd., Montreal, Quebec, Canada Japan Display '92 pp. 407–410.
North Atlantic Treaty Organization —Advisory Group for Aerospace Research and Development AGARD Conference Proceedings No. 249, "Piloted Aircraft Environment Simulation Techniques" by Brian L. Welch.

*Primary Examiner*—Richard Hjerpe
*Assistant Examiner*—Kent Chang
*Attorney, Agent, or Firm*—Fishman, Dionne, Cantor & Colburn

[57] ABSTRACT

For displaying moving images on a field sequential color display device from a simultaneous color image source, without color break-up appearing in the observed image, an image shift device is provided for shifting each color component image within each cycle of color component images representing each frame of the simultaneous color video image source. The display device is for use with head mounted displays in which an LCD or a CRT screen is used to display field sequential color images without color break-up during head motion.

16 Claims, 4 Drawing Sheets

MOTION OF OBJECT ON DISPLAY

IMAGE OF OBJECT FOCUSSED ON RETINA

ALL COLOURS SUPERIMPOSED

RED IMAGE    GREEN IMAGE    BLUE IMAGE

FIELD SEQUENTIAL COLOR HEAD MOUNTED DISPLAY WITH SUPPRESSED COLOR BREAK-UP

FIELD OF THE INVENTION

The present invention relates to a field sequential color display device and method. More particularly, the present invention relates to a field sequential color display device which suppresses color break-up which occurs when there is rapid motion of a color image being viewed, as is the case with head mounted displays, and the color image source is a simultaneous color image source.

BACKGROUND OF THE INVENTION

It can be desirable in head mounted displays to use field sequential color display devices to improve picture quality, reduce weight or reduce costs of manufacture. When used however with an image source such as a color television camera or a computer image generator which are operating in the conventional simultaneous color mode, color fringes are seen on objects during angular head motion. If the head motion is sufficiently rapid, three distinct red, blue and green images can be seen. The effect is also observed during rapid motion of an object within the color display when the head is stationary and is often called field sequential color break-up.

In order to understand the invention, it is first necessary to have a clear understanding of why color break-up occurs. As is well known in the art, television creates the illusion of smooth motion by drawing successive images at a sufficiently fast rate that the human visual system can no longer see the individual images (i.e. the image is flicker-free). If the entire image or the objects within the image are moved appropriately relative to the previous image, the visual system will interpret the sequence of images as smooth motion. FIG. 1 shows the motion of an upstanding arrow on a display moving from right to left in five sequential positions. The arrow represents any fixed object within the scene being displayed. The movement from right to left, in the case of a head mounted display, is caused by a rotational head motion from left to right. As is known, the human eye never views an image, whether still or moving, focusing only on one portion of the image. The human eye will tend to pick portions of an image to focus on and typically will wander from different portions of the image according to interest and the need to gather information. When the image moves across the display as illustrated in FIG. 1, the eye typically fixates on a given object within the moving image, at least temporarily, before switching to another portion or object within the image to be observed. The eye therefore tracks each portion of the image that is to be observed as that portion of the image or object moves across the display.

In the example of the object represented by the upstanding arrow, the eye tracks the object as it moves from right to left. Even though the image appears at a finite number of discrete locations, the eye will move or rotate with a substantially constant velocity to track the object. The rotating eye is illustrated in FIG. 2. It will be noted that all of the consecutive images are to be focused on the retina at the same position. This position is typically within a portion of the retina where good high resolution vision is to be had as opposed to a surrounding area of poorer lower resolution vision. When the color image displayed at each of the five discrete positions as illustrated in FIG. 3 is carried out using a simultaneous color video display, the red, green and blue component images are caused to appear simultaneously at each of the five discrete positions and the resulting image on the retina is as illustrated in FIG. 3a (for sake of clarity, the inversion of the image on the retina is not illustrated).

In the case that a field sequential color display device sequentially displays the color component images from a simultaneous color image source, to present the images as illustrated in FIG. 1, the time lag between displaying the sequential color component images will give rise to a separation of the object into three color component images, as illustrated in FIG. 3b, as a result of the constant velocity of the eye, as illustrated in FIG. 2. The degree of spatial separation of the color component images is proportional to the rotational velocity of the eye, and thus, proportional to the angular velocity of movement of the image with respect to the display.

In conventional color video displays, each image is usually called a field and the field rate is 60 Hz in the U.S. The color component images are displayed synchronously on the display such that the observer sees a single correctly colored image. When a field sequential display is used to display video from a simultaneous color image source, the red, blue and green images are drawn sequentially at a field rate commonly three times as high as the normal rate, namely, 180 Hz in the U.S. A typical field sequential color display device is a liquid crystal display device operating as a monochrome display which is provided with color illumination or filters which operate in an alternating sequence of red, blue and green, such that the alternating sequential monochrome images corresponding to the red, blue and green color component images, can be seen with varying color intensities to give the illusion of color video.

In the case of a head mounted display using head tracking to control the image such that the wearer sees a stable virtual environment, rotation of the head causes an equal and opposite movement of the image. If the image has been created by a device operating in the simultaneous color mode and the display is operating in the field sequential mode, the problem described above will occur. The problem could obviously be circumvented by operating the device creating the image, i.e. either a Computer Image Generator (CIG) system or a television camera, in the field sequential mode. This would be, however, a very expensive proposition and would furthermore discourage the use of field sequential helmet mounted displays.

U.S. Pat. No. 5,369,450 to Haseltine et al describes how color aberrations in a head mounted display operating in a field sequential mode can be corrected by electronic means. The color aberrations described by Haseltine, however, are caused by the different refractive indices of the optical components for red, blue and green and are not a function of head motion.

SUMMARY OF THE INVENTION

It is an object of the invention to correct the problems described above using a simple and relatively inexpensive technique which allows conventional field sequential color display devices to be used with standard simultaneous color image sources without the observer seeing color fringes during certain types of motion. In the case of a flight simulator or other virtual reality systems, the simulataneous color image source is a computer image generator operating in real time. In a telepresence system, a live camera is gimbal mounted on a robot and is driven by servo control to view in the direction of the observer's head. In the case of a land vehicle simulator or a land vehicle telepresence robot, rapid motion may result from road bumps or the like and thus may not be the exclusive result of observer head motion. Therefore the angular velocity is understood to be a comination of both the observer's head and any rapid robot or simulated vehicle angular movement.

It is furthermore an object of the present invention to provide a field sequential color display device and method in which color break-up is suppressed by moving each field of a color image by an amount equivalent to the angular motion of the observer's head in that field. Shifting of the color component images (fields) within each cycle can be done optically in the optical image relay systems (e.g. mirrors and lenses), using horizontal and vertical CRT controls, by electronically shifting image data in an electronic display, or by data processing in the video processor feeding the color component images to the display.

According to the invention, there is provided a field sequential color display device for use in displaying an image of an environment comprising a field sequential image generator for sequentially generating a cycle of color component images of a color image on a head mounted display screen from a simultaneous color video image source, color filter means for making the color component images of the cycle appear to have a different color, such that a mixing of the color component images as seen with the color filter means provides an observer with the color image, means for determining an angular velocity of a head of the observer and for generating a head velocity signal, and image shift means for shifting on the screen the color component images of the cycle with respect to one another as a function of the velocity signal, whereby color break-up in the field sequential color display is suppressed.

The invention also provides a method for displaying a simultaneous color video on a field sequential color display device for use in displaying an image of an environment comprising the steps of generating color component images from the simultaneous color video signal, sequentially displaying the color component images on a head mounted display screen and providing a color filter for each of the color component images to appear to have a different color, such that a mixing of the color component images as seen by an observer results in the appearance of a normal color image, determining an angular velocity of a head of the observer, and shifting the color component images with respect to one another as a function of the velocity to suppress color break-up in the field sequential color display.

DETAILED DESCRIPTION OF THE PREFERRED EMBODIMENTS

Figure 1:
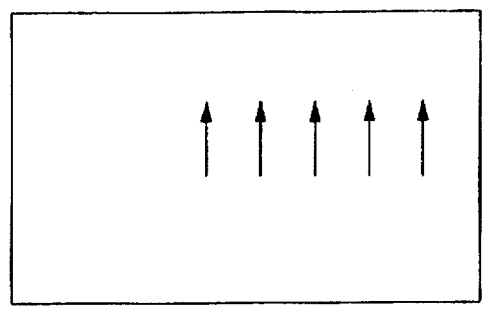
FIG. 1 illustrates a series of 5 objects within an image being displayed to create the illusion of object motion from right to left as is known in the art.

FIG. 1 shows an upstanding arrow object at five different locations or a full color display. The color of the arrow is white. In the preferred embodiment, a head mounted display is used. A left to right head movement results in the right to left image movement shown.

Figure 2:
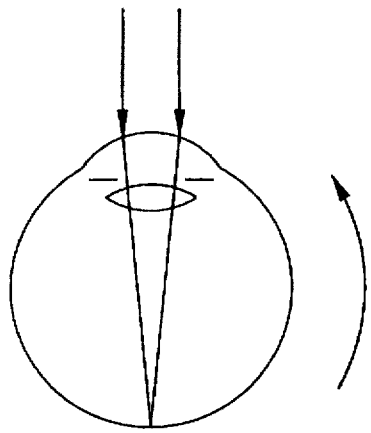
FIG. 2 illustrates a cross-section of an observer's eyeball illustrating schematically the image formed on the retina and the direction of rotation of the eye as an object is tracked during motion as illustrated in FIG. 2.

As illustrated in FIG. 2, the eye rotates smoothly to track the upstanding arrow and moves at the same speed as the arrows such that the succession of arrow images fall on the same place and result in the observer seeing a single white upstanding arrow.

Figure 3A:
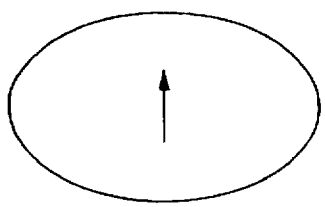
FIGS. 3a and 3b illustrate respectively in schematic format the image appearing on the observer's retina for simultaneous color mode display and field sequential color mode display.
Figure 3B:
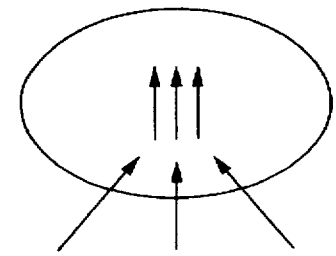

FIG. 3a illustrates the upstanding arrow image on the retina with all colors superimposed when a normal simultaneous display is employed. FIG. 3b illustrates the image that would be seen if the image displayed in FIG. 3 had been five frames of a field sequential display system as illustrated in FIG. 1 in which a succession of red, green and blue images were displayed at each of the five positions as the object moves from right to left on the screen. As shown, the rotation of the eye results in a break-up of the object image into its color components due to the lag in delivery of the color component images.

Figure 4:
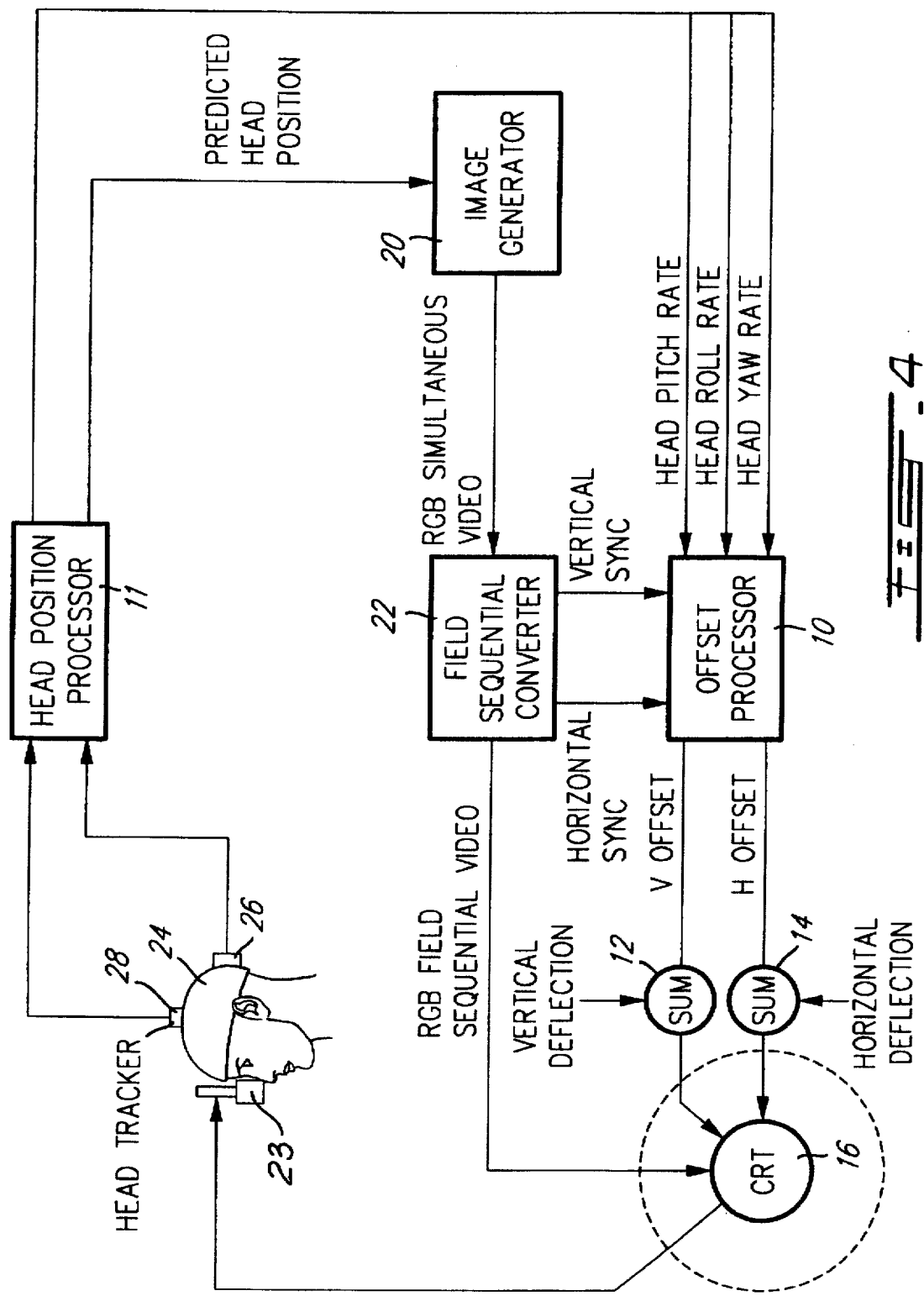
FIG. 4 is a block schematic diagram of a horizontal and vertical offset deflection processor providing image shift means according to the preferred embodiment.

In the preferred embodiment, as illustrated in FIG. 4, the invention is applied to a head mounted display 16 as is known in the art, for example, as disclosed in U.S. Pat. No. 5,348,477 and in "HDTV Virtual Reality", Japan Display 192, pp. 407 to 410. The image presented on the screen being viewed is that of a virtual environment. As the observer's head moves, the image being displayed must be shifted up and down and left to right and rotated so that the observer sees a stable representation of the environment corresponding to the orientation of his or her head. The processor 10 is an electronic processor receiving from processor 11 head pitch rate data, head roll rate data and head yaw rate data. The horizontal and vertical sync signals are fed to processor 10 from the field sequential converter 22. The head position processor 11 uses the actual position of helmet 24 from the position sensor 28 output for determining actual pitch, roll and yaw positions. Based on these actual positions and the pitch, roll and yaw acceleration or velocity measurements from sensor 26, processor 11 computes the predicted head position for image generator 20. The appropriate vertical and horizontal scan offsets are calculated in offset processor 10. In the general case, when the optical axis of the CRT 16 as seen by the eye through the head mounted display optics 23 is not orthogonal to either the vertical or horizontal axis of the head, both offsets will be a function of pitch roll and yaw. The optical axis of the CRT is defined as the line which is normal to the face of the CRT and passes through the center of the image.

Figure 5:
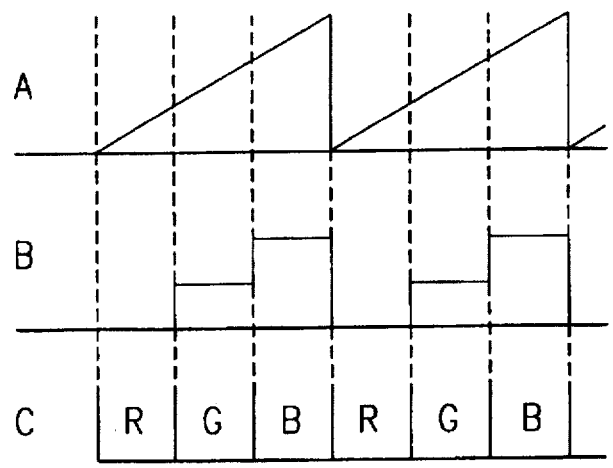
FIG. 5 illustrates the waveform of the offset signal for a continuously varying function (A) for a complete cycle of RGB fields and as discrete values (B) for each RGB field, with the vertical sync pulses (C)

The offsets are then added to the respective deflection signals in the amplifiers 12 and 14 which drive, respectively, the horizontal and vertical deflection mechanism of the CRT display 16. The processor 10 can also take into account any distortion introduced in the deflection signals to compensate for distortion in the optical system. Typical offset waveforms are shown in FIG. 5 along with the vertical sync signal pulse which occurs at the beginning of each field.

In most cases, the roll term can be omitted without causing a significant error, which simplifies the implementation of the processor 10. If roll is to be corrected when using a CRT display, horizontal and vertical offsets need to be varied over each horizontal line scan of the electron beam in a different manner for each subsequent scan from the top to the bottom of the CRT display.

The continuously varying offset (sawtooth waveform in FIG. 5) also adjusts for the vertical presentation delay, correcting the "tilted image phenomena" as discussed on page 54 of AGARD Advisory Report No. 164 entitled "Characteristics of Flight Simulator Visual Systems", published May 1981.

Figure 6:
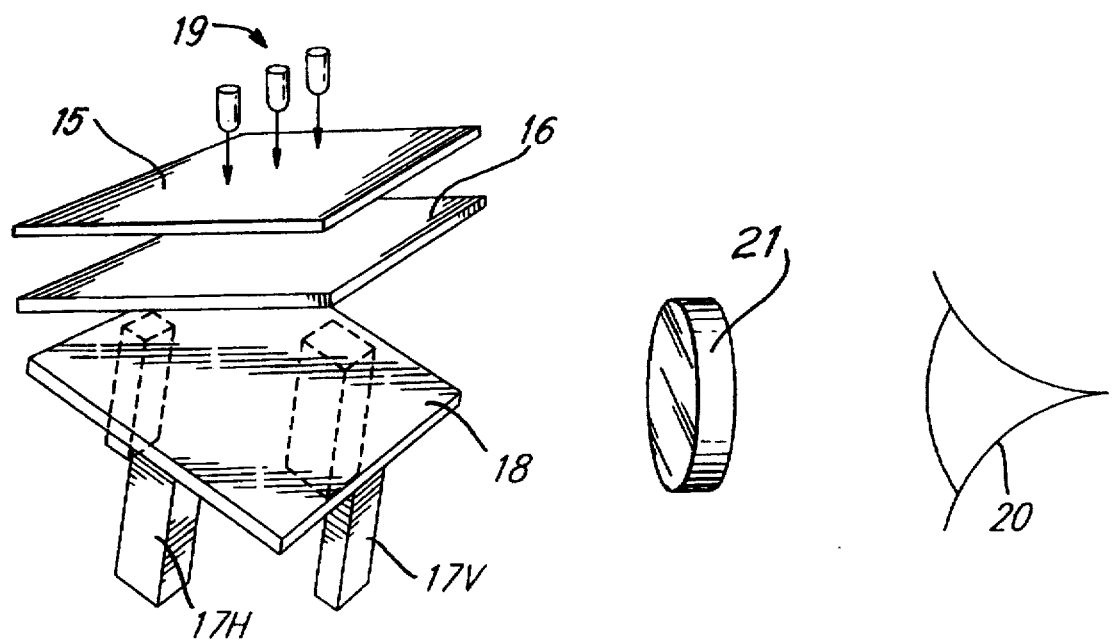
FIG. 6 illustrates an alternative embodiment in which an opto-mechanical shifting of the viewed image is achieved by mounting a relay mirror on piezoelectric transducers which are energized by the appropriate offset signal to shift the image for each field by the appropriate offset for the speed of the object in motion being viewed on the screen.

In FIG. 6, an alternative embodiment is illustrated in which the display 16 is a ferroelectric liquid crystal display (FELCD) which is illuminated by an LED light source 19 which includes red, blue and green LEDs for illuminating a diffuser screen 15 located behind LCD display 16. The observer at 20 views screen 16 through optics 21 and a mirror 18. The mirror 18 is mounted on four electromagnetic transducers 17, the transducers 17 being connected to a housing of the display (not shown). In order to shift the color component images within the cycle with respect to one another, the transducers are energized with a current proportional to the amount of displacement required. The pair of transducers 17h adjust the horizontal displacement of the image and the pair of transducers 17v adjust the vertical displacement of the image. An appropriate offset waveform as illustrated at B in FIG. 5 may be used to move the image viewed on display 16. In the embodiment illustrated in FIG. 6, transducers 17 would be fed an amplified signal coming from processor 10 similar to the preferred embodiment, with the exception of course, that the signal must be sloped to account for the inertia of the transducers and mirror.

Figure 7:
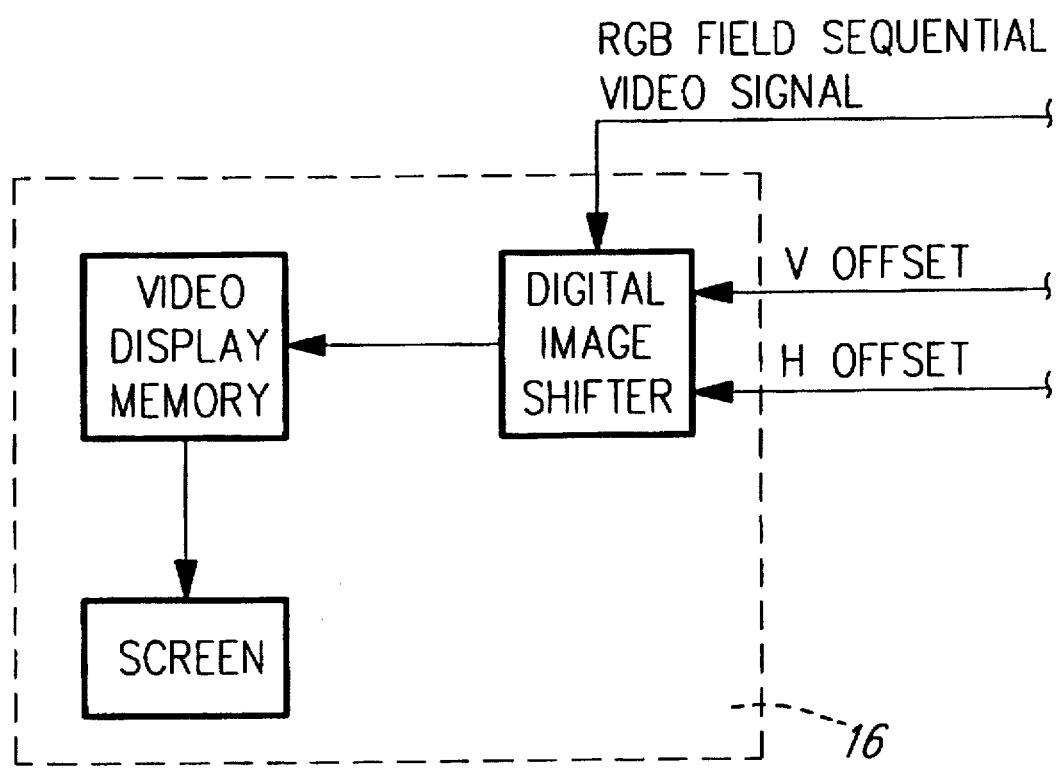
FIG. 7 illustrates a block diagram of a digital display screen including a digital image shifter.

The invention also contemplates that the image memory device or video display controller used for storing each color component image could be shifted by the appropriate number of pixels in hardware dedicated to such image shifting in a matter of a very short period of time. As shown in FIG. 7, the field sequential RGB video pixel data is shifted by a digital image shifter by amounts determined by the vertical and horizontal offset signals (received from processor 10) before being transferred to the video display memory.

Alternatively, the digital image shifter could be integrated into the converter 22. Once the composite color video image is received, the first image to be displayed, e.g. the red color component image, which does not need to be shifted for simple whole image step shifting, can be immediately relayed to the screen. While displaying the first red color component image, the hardware could shift by the appropriate amount indicated by processor 10, the subsequent green and blue color component images, and relay them to the screen for display when required.

A video display controller which can shift a whole video image vertically and horizontally on a screen of a simultaneous color video display unit is disclosed in U.S. Pat. No. 4,737,778 to Nishi et al. Digital displays in which each pixel is addressed digitally are known in the art, such as ferroelectric liquid crystal display (FELCD), a deformable mirror display (DMD), an active matrix liquid crystal display (AMLCD), and an field emitter display (FED).

The invention works equally well whether the device is mounted directly on the head or optically coupled to the head via fiber optic cables. In addition to using optomechanical mirrors to shift the image, it would equally be possible to use an opto-electronic device to shift the image in a functionally similar manner.

We claim:

1. A field sequential color display device for use in displaying an image of an environment comprising:
   a field sequential image generator for sequentially generating a cycle of color component images of a color image on a head mounted display screen from a simultaneous color video image source;
   color filter means for making said color component images of said cycle appear to have a different color, such that a mixing of said color component images as seen with said color filter means provides an observer with said color image;
   means for determining an angular velocity of a head of said observer and for generating a head velocity signal; and
   image shift means for shifting on said screen said color component images of said cycle with respect to one another as a function of said velocity signal, whereby color break-up in said field sequential color display is suppressed.

2. The display device as claimed in claim 1, wherein the image shift means comprise a processor being fed a sync signal and said velocity signal for generating vertical and horizontal offset signals for said screen when displaying said color component images.

3. The display device as claimed in claim 2, wherein said screen is a cathode ray tube (CRT) display device and said vertical and horizontal offset signals control vertical and horizontal deflections in said CRT display device respectively.

4. The display device as claimed in claim 2, wherein said velocity signal comprises head pitch, roll and yaw rate data.

5. The display device as claimed in claim 3, wherein said offset signals vary continuously over each field to compensate for delay in image presentation due to vertical scan time.

6. The display device as claimed in claim 3, wherein said offset signals vary continuously over each horizontal line scan of each field to roll said images on said display.

7. The display device as claimed in claim 1, wherein said image shift means comprise a relay mirror having an angular orientation with respect to said screen which is adjustable by transducer means.

8. The display device as claimed in claim 7, wherein the image shift means comprise a processor being fed a sync signal and said velocity signal for generating vertical and horizontal offset signals for said transducer means when displaying said color component images.

9. The display device as claimed in claim 8, wherein said offset signals vary continuously over each field to compensate for delay in image presentation due to vertical scan time.

10. The display device as claimed in claim 1, wherein said screen is a digital display, said image shift means comprising vertical and horizontal digital image shift circuits.

11. A method for displaying a simultaneous color video signal on a field sequential color display device for use in displaying an image of an environment comprising the steps of:
   generating color component images from said simultaneous color video signal;
   sequentially displaying said color component images on a head mounted display screen and providing a color filter for each of said color component images to appear to have a different color, such that a mixing of said color component images as seen by an observer results in the appearance of a normal color image;

determining an angular velocity of a head of said observer; and shifting said color component images with respect to one another as a function of said velocity to suppress color break-up in said field sequential color display.

12. The method as claimed in claim 11, wherein said step of shifting comprises changing a cathode ray tube (CRT) display horizontal and vertical deflection signals.

13. The method as claimed in claim 12, wherein said velocity comprises head pitch, roll and yaw rate data.

14. The method as claimed in claim 12, wherein said deflection signals are varied continuously over each field to compensate for delay in image presentation due to vertical scan time.

15. The method as claimed in claim 12, wherein said deflection signals are varied continuously over each horizontal line scan of each field to roll said images on said display.

16. The method as claimed in claim 11, wherein said step of shifting comprises adjusting an angular position of a mirror.

* * * * *